United States Patent
Shah et al.

(10) Patent No.: US 12,228,186 B2
(45) Date of Patent: Feb. 18, 2025

(54) WHEEL END ASSEMBLY

(71) Applicant: ArvinMeritor Technology, LLC, Troy, MI (US)

(72) Inventors: Deval H. Shah, Novi, MI (US); Stephen A. Federighe, Washington, MI (US); Jeffrey C. Audet, Chesterfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 271 days.

(21) Appl. No.: 16/991,861

(22) Filed: Aug. 12, 2020

(65) Prior Publication Data
US 2022/0049751 A1    Feb. 17, 2022

(51) Int. Cl.
| | |
|---|---|
| *F16D 65/22* | (2006.01) |
| *B60T 1/06* | (2006.01) |
| *F16D 51/00* | (2006.01) |
| *F16D 125/30* | (2012.01) |

(52) U.S. Cl.
CPC ............. *F16D 65/22* (2013.01); *B60T 1/067* (2013.01); *F16D 2051/003* (2013.01); *F16D 2125/30* (2013.01)

(58) Field of Classification Search
CPC . F16D 2125/30; F16D 2051/003; B60T 1/067
See application file for complete search history.

(56) References Cited

U.S. PATENT DOCUMENTS

| | | | |
|---|---|---|---|
| 8,827,054 B2 | 9/2014 | Chung et al. | |
| 9,090,283 B1 | 7/2015 | Lam et al. | |
| 9,096,259 B2 | 8/2015 | Varela et al. | |
| 9,291,223 B2 | 3/2016 | Varela et al. | |
| 9,598,104 B1 | 3/2017 | Lam et al. | |
| 9,611,909 B2* | 4/2017 | Hayford | F16J 15/3268 |
| 9,945,434 B2* | 4/2018 | Jenkinson | F16D 51/28 |
| 2002/0089141 A1* | 7/2002 | Bennett | B60T 1/067 |
| | | | 280/93.502 |
| 2014/0042722 A1 | 2/2014 | Lam | |
| 2014/0262643 A1* | 9/2014 | Dettloff | F16D 65/09 |
| | | | 188/251 R |
| 2014/0345994 A1* | 11/2014 | Varela | F16D 51/20 |
| | | | 188/329 |
| 2017/0030422 A1* | 2/2017 | Berwanger | F16D 65/60 |

OTHER PUBLICATIONS

Meritor, Meritor Drum Brake and Wheel End Parts Catalog PB-8857, copyright 2019, rev. 12-19, 460 pages, Meritor Heavy Vehicle Systems, LLC, Florence, Kentucky USA.

Meritor, Front Drive Steering Axle Parts Catalog PB-9151, copyright 2002, 67 pages, Meritor Heavy Vehicle Systems, LLC, Florence, Kentucky USA.

* cited by examiner

*Primary Examiner* — Melody M Burch (74) *Attorney, Agent, or Firm* — Brooks Kushman PC (57) ABSTRACT

A wheel end assembly having a knuckle, a brake spider, and a drum brake assembly. The knuckle may have a first mounting boss that may extend from a spindle mounting surface. The drum brake assembly may be mounted to the brake spider. The drum brake assembly may include a brake pad assembly that may extend partially around a first mounting boss.

24 Claims, 3 Drawing Sheets

Fig-4

WHEEL END ASSEMBLY

TECHNICAL FIELD

This disclosure relates to a wheel end assembly that may include a drum brake assembly.

BACKGROUND

An axle assembly having a knuckle is disclosed in U.S. Pat. No. 9,291,223.

SUMMARY

In at least one embodiment, a wheel end assembly is provided. The wheel end assembly may include a knuckle, a brake spider, and a drum brake assembly. The knuckle may include a spindle mounting surface and a first mounting boss. The first mounting boss may extend from the spindle mounting surface. The first mounting boss may include a first boss portion and a second boss portion. The first boss portion may be spaced apart from the second boss portion. The brake spider may be mounted to the first boss portion and the second boss portion. The drum brake assembly may be mounted to the brake spider. The drum brake assembly may include a brake pad assembly. The brake pad assembly may extend partially around the first mounting boss.

In at least one embodiment, a wheel end assembly is provided. The wheel end assembly may include a knuckle, a brake spider, and a drum brake assembly. The knuckle may include a spindle mounting surface and a first mounting boss. The spindle mounting surface may extend around an axis. The first mounting boss may extend from the spindle mounting surface. The brake spider may have a mounting flange and a camshaft boss. The mounting flange may engage and may be coupled to the first mounting boss. The camshaft boss may extend from the mounting flange and may define a camshaft hole that may receive camshaft. The drum brake assembly may be mounted to the brake spider. The drum brake assembly may include a brake pad assembly. The brake pad assembly may extend partially around the first mounting boss. The brake pad assembly may be axially positioned closer to the spindle mounting surface than the mounting flange.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
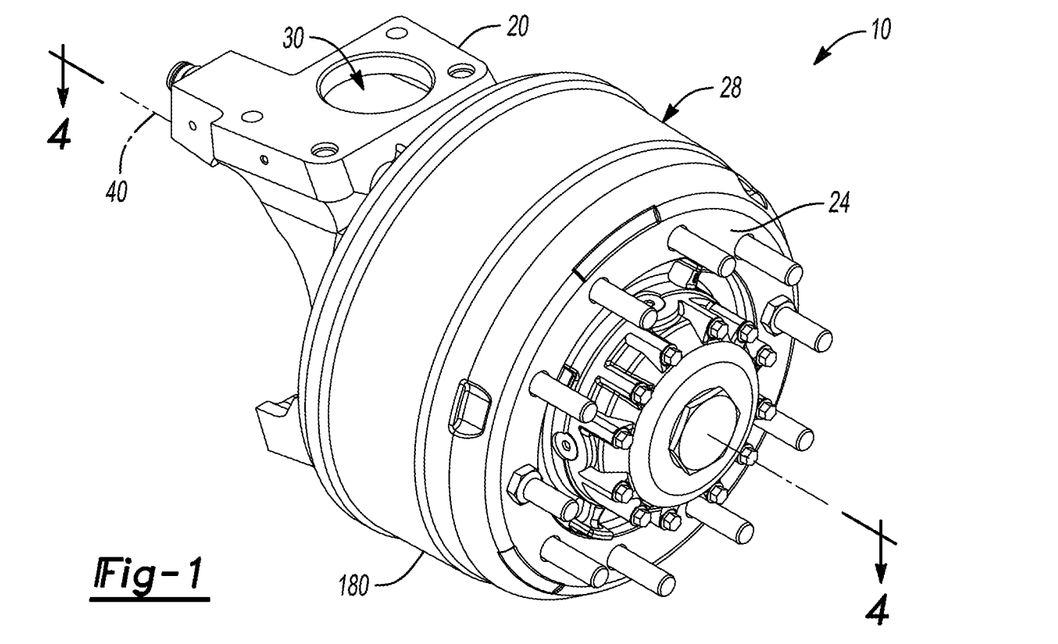
FIG. 1 is a perspective view of an example of a wheel end assembly.

Referring to FIG. 1, an example of a wheel end assembly 10 is shown. The wheel end assembly 10 may be provided with a vehicle like a truck, bus, farm equipment, mining equipment, military transport or weaponry vehicle, or cargo loading equipment for land, air, or marine vessels. The vehicle may include a trailer for transporting cargo in one or more embodiments.

The wheel end assembly 10 may be configured to rotatably support a vehicle wheel that may support a tire. In addition, the wheel end assembly 10 may include one or more components that may facilitate braking of the wheel or changing the direction of travel of the vehicle. In at least one configuration and as is best shown with reference to FIGS. 1, 2 and 4, the wheel end assembly 10 may include a knuckle 20, a spindle 22, a hub 24, a brake spider 26, and a drum brake assembly 28.

Figure 2:
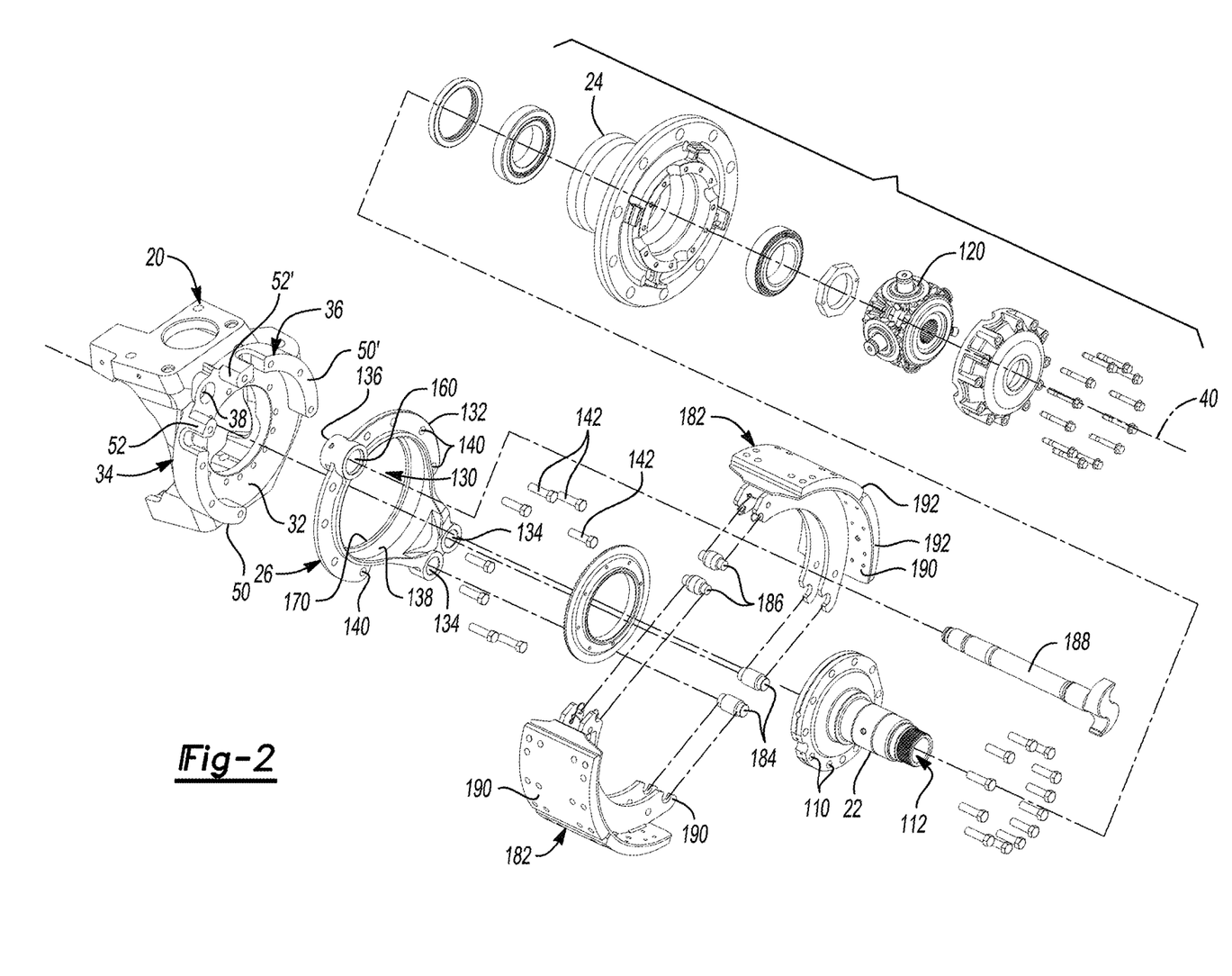
FIG. 2 is an exploded view of a portion of the wheel end assembly shown in FIG. 1.
Figure 3:
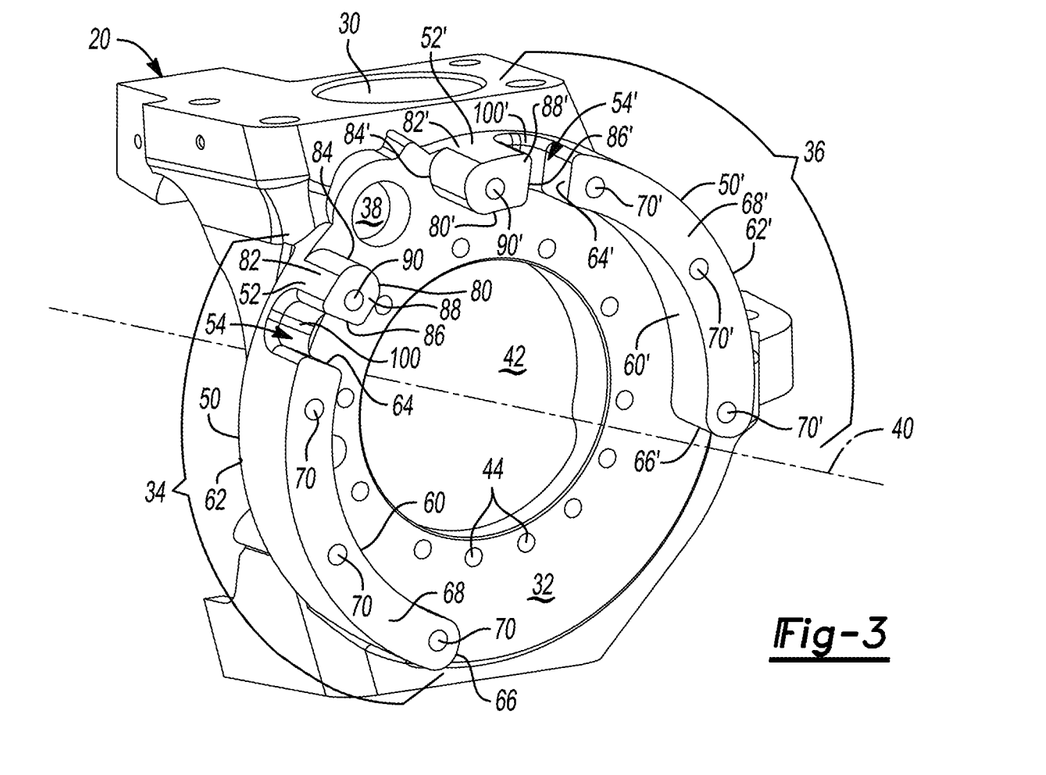
FIG. 3 is a perspective view of a knuckle of the wheel end assembly.

Referring primarily to FIGS. 2 and 3, the knuckle 20 may support various components of the wheel end assembly 10. The knuckle 20 may be provided in a steerable configuration or in a non-steerable configuration. In a steerable configuration, the knuckle 20 may be part of a steering system that may be used to steer or change the direction of the vehicle. For example, the knuckle 20 may include at least one kingpin hole 30 that may receive a kingpin that may couple the knuckle 20 to an axle beam such that the knuckle 20 may pivot about the kingpin. In a non-steerable configuration, the knuckle 20 may be fixedly mounted to another component, such as an axle beam or axle housing and may not be used to steer or change direction of the vehicle. In at least one configuration, the knuckle 20 may include a spindle mounting surface 32, a first mounting boss 34, a second mounting boss 36, and a camshaft hole 38.

The spindle mounting surface 32 may extend around an axis 40 and/or an opening 42 in the knuckle 20. A set of spindle mounting holes 44 may be provided in the spindle mounting surface 32. The spindle mounting holes 44 may be spaced apart from each other and may be radially disposed about the axis 40. In addition, the spindle mounting holes 44 may be threaded.

The first mounting boss 34 may facilitate mounting of the brake spider 26. The first mounting boss 34 may extend from the spindle mounting surface 32. More specifically, the first mounting boss 34 may extend in an axial direction or in a direction that extends along the axis 40 from the spindle mounting surface 32 in a direction that extends away from the kingpin hole 30, if provided. The first mounting boss 34 may be disposed proximate the perimeter or outside circumference of the spindle mounting surface 32. In at least one configuration, the first mounting boss 34 may include a first boss portion 50, a second boss portion 52, and an opening 54.

The first boss portion 50 may facilitate mounting of the brake spider 26 or coupling of the brake spider 26 to the knuckle 20. The first boss portion 50 may protrude from the spindle mounting surface 32. In at least one configuration, the first boss portion 50 may include an inner surface 60, an outer surface 62, a first connecting surface 64, a second connecting surface 66, a first end surface 68, and one or more mounting features 70.

The inner surface 60 may face toward the axis 40. In addition, the inner surface 60 may extend from the spindle mounting surface 32 to or toward the first end surface 68. The inner surface 60 may be spaced apart from the spindle mounting holes 44. In at least one configuration, the inner surface 60 may extend along an arc or may be disposed at a substantially constant radial distance from the axis 40. In such a configuration, the inner surface 60 may be radially disposed with respect to the axis 40.

The outer surface 62 may be disposed opposite the inner surface 60. As such, the outer surface 62 may face away from the axis 40. The outer surface 62 may extend from the spindle mounting surface 32 to or toward the first end surface 68. In at least one configuration, the outer surface 62 may extend along an arc or may be disposed at a substantially constant radial distance from the axis 40. For instance, the outer surface 62 may be arranged substantially parallel to the inner surface 60.

The first connecting surface 64 may extend from the spindle mounting surface 32 to or toward the first end surface 68. In addition, the first connecting surface 64 may extend between the inner surface 60 and the outer surface 62 or may extend from the inner surface 60 to the outer surface 62. In at least one configuration, the first connecting surface 64 may face toward the second boss portion 52 and may at least partially define the opening 54. The first connecting surface 64 or a portion thereof may be substantially planar in one or more configurations.

The second connecting surface 66 may be disposed opposite the first connecting surface 64. The second connecting surface 66 may extend from the spindle mounting surface 32 to or toward the first end surface 68. In addition, the second connecting surface 66 may extend between the inner surface 60 and the outer surface 62 or may extend from the inner surface 60 to the outer surface 62. The second connecting surface 66 may be disposed proximate the bottom of the knuckle 20 and may be disposed below the axis 40 and/or the opening 42 in the knuckle 20 in one or more configurations. The second connecting surface 66 may be curved or extend along an arc.

The first end surface 68 may face away from the spindle mounting surface 32. The first end surface 68 may extend from the inner surface 60 to the outer surface 62. In addition, the first end surface 68 may extend from the first connecting surface 64 to the second connecting surface 66. The first end surface 68 may be substantially planar in one or more configurations. The first end surface 68 may be offset from the spindle mounting surface 32. For instance, the first end surface 68 may be spaced apart from the spindle mounting surface 32. In at least one configuration, the first end surface 68 may be disposed substantially parallel to the spindle mounting surface 32. The first end surface 68 may face toward and may engage the brake spider 26 as will be discussed in more detail below.

One or more mounting features 70 may be provided with the first end surface 68. In the configuration shown, three mounting features 70 are shown; however, it is contemplated that a greater or lesser number of mounting features 70 may be provided. The mounting features 70 may have any suitable configuration, such as a male configuration, a female configuration or combinations thereof. For example, a mounting feature 70 may be configured as a hole that may extend from the first end surface 68 toward the spindle mounting surface 32.

The second boss portion 52 may be spaced apart from the first boss portion 50. In the configuration shown, the second boss portion 52 may be disposed closer to the camshaft hole 38 than the first boss portion 50. Like the first boss portion 50, the second boss portion 52 may facilitate mounting of the brake spider 26 and may protrude from the spindle mounting surface 32. In at least one configuration, the second boss portion 52 may have an inner surface 80, an outer surface 82, a first connecting surface 84, a second connecting surface 86, a second end surface 88, and one or more mounting features 90.

The inner surface 80 may face toward the axis 40. In addition, the inner surface 80 may extend from the spindle mounting surface 32 to or toward the second end surface 88. The inner surface 80 may be spaced apart from the spindle mounting holes 44. In at least one configuration, the inner surface 80 may extend along an arc or may be disposed at a substantially constant radial distance from the axis 40. In such a configuration, the inner surface 80 may be radially disposed with respect to the axis 40.

The outer surface 82 may be disposed opposite the inner surface 80. As such, the outer surface 82 may face away from the axis 40. The outer surface 82 may extend from the spindle mounting surface 32 to or toward the second end surface 88. In at least one configuration, the outer surface 82 may extend along an arc or may be disposed at a substantially constant radial distance from the axis 40. For instance, the outer surface 82 may be arranged substantially parallel to the inner surface 80.

The first connecting surface 84 may extend from the spindle mounting surface 32 to or toward the second end surface 88. In addition, the first connecting surface 84 may extend between the inner surface 80 and the outer surface 82 or may extend from the inner surface 80 to the outer surface 82. In at least one configuration, the first connecting surface 84 may face toward the first boss portion 50 and may at least partially define the opening 54. In at least one configuration, the first connecting surface 84 may be substantially planar.

The second connecting surface 86 may be disposed opposite the first connecting surface 84 and may face toward the first connecting surface 64 of the first boss portion 50. The second connecting surface 86 may extend from the spindle mounting surface 32 to or toward the second end surface 88. In addition, the second connecting surface 86 may extend between the inner surface 80 and the outer surface 82 or may extend from the inner surface 80 to the outer surface 82. The second connecting surface 86 may be disposed above the axis 40 in one or more configurations. In at least one configuration, the second connecting surface 86 may be curved or extend along an arc.

The second end surface 88 may face away from the spindle mounting surface 32. The second end surface 88 may extend from the inner surface 80 to the outer surface 82. In addition, the second end surface 88 may extend from the first connecting surface 84 to the second connecting surface 86. The second end surface 88 may be substantially planar in one or more configurations. The second end surface 88 may be offset from the spindle mounting surface 32. For instance, the second end surface 88 may be spaced apart from the spindle mounting surface 32. In at least one configuration, the second end surface 88 may be disposed substantially parallel to the spindle mounting surface 32 and/or the first end surface 68. The second end surface 88 may be substantially coplanar with the first end surface 68. The second end surface 88 may face toward and may engage the brake spider 26 as will be discussed in more detail below.

One or more mounting features 90 may be provided with the second end surface 88. In the configuration shown, one mounting feature 90 is shown; however, it is contemplated that a greater number of mounting features 70 may be provided. The mounting features 70 may have any suitable configuration such as a male configuration, a female configuration, or combinations thereof. For example, a mounting features 90 may have the same configuration as the mounting features 70 of the first boss portion 50.

The opening 54 may be disposed between the first boss portion 50 and the second boss portion 52. The opening 54 may be at least partially defined by the first boss portion 50 and the second boss portion 52. For example, the opening 54 may be at least partially defined by the first connecting surface 64 of the first boss portion 50 and the second connecting surface 86 of the second boss portion 52. In addition, the opening 54 may be at least partially defined by an opening bottom surface 100.

The opening bottom surface 100 may extend from the first boss portion 50 to the second boss portion 52. For example, the opening bottom surface 100 may extend from the first connecting surface 64 of the first boss portion 50 to the second connecting surface 86 of the second boss portion 52. In at least one configuration, the opening bottom surface 100 may be offset from the spindle mounting surface 32. For instance, the opening bottom surface 100 may be recessed from the spindle mounting surface 32 such that the opening bottom surface 100 may be axially positioned further from the brake spider 26 than the spindle mounting surface 32.

The second mounting boss 36 may facilitate mounting of the brake spider 26. The second mounting boss 36 may extend from the spindle mounting surface 32. More specifically, the second mounting boss 36 may extend in an axial direction from the spindle mounting surface 32 in a direction that extends away from the kingpin hole 30, if provided. The second mounting boss 36 may be disposed proximate the perimeter or outside circumference of the spindle mounting surface 32. In at least one configuration, the second mounting boss 36 may include a third boss portion 50', a fourth boss portion 52', and an opening 54'.

The third boss portion 50' may facilitate mounting of the brake spider 26 or coupling of the brake spider 26 to the knuckle 20. The third boss portion 50' may protrude from the spindle mounting surface 32. In at least one configuration, the third boss portion 50' may include an inner surface 60', an outer surface 62', a first connecting surface 64', a second connecting surface 66', a third end surface 68', and one or more mounting features 70'.

The inner surface 60' may face toward the axis 40. In addition, the inner surface 60' may extend from the spindle mounting surface 32 to or toward the third end surface 68'. The inner surface 60' may be spaced apart from the spindle mounting holes 44. In at least one configuration, the inner surface 60' may extend along an arc or may be disposed at a substantially constant radial distance from the axis 40. In such a configuration, the inner surface 60' may be radially disposed with respect to the axis 40.

The outer surface 62' may be disposed opposite the inner surface 60'. As such, the outer surface 62' may face away from the axis 40. The outer surface 62' may extend from the spindle mounting surface 32 to or toward the third end surface 68'. In at least one configuration, the outer surface 62' may extend along an arc or may be disposed at a substantially constant radial distance from the axis 40. For instance, the outer surface 62' may be arranged substantially parallel to the inner surface 60'.

The first connecting surface 64' may extend from the spindle mounting surface 32 to or toward the third end surface 68'. In addition, the first connecting surface 64' may extend between the inner surface 60' and the outer surface 62' or may extend from the inner surface 60' to the outer surface 62'. In at least one configuration, the first connecting surface 64' may face toward the fourth boss portion 52' and may at least partially define the opening 54'. The first connecting surface 64 or a portion thereof may be substantially planar in one or more configurations.

The second connecting surface 66' may be disposed opposite the first connecting surface 64'. The second connecting surface 66' may extend from the spindle mounting surface 32 to or toward the third end surface 68'. In addition, the second connecting surface 66' may extend between the inner surface 60' and the outer surface 62' or may extend from the inner surface 60' to the outer surface 62'. The second connecting surface 66' may be disposed proximate the bottom of the knuckle 20 and may be disposed below the axis 40 and/or the opening 42 in the knuckle 20 in one or more configurations. The second connecting surface 66' may be curved or extend along an arc.

The third end surface 68' may face away from the spindle mounting surface 32. The third end surface 68' may extend from the inner surface 60' to the outer surface 62'. In addition, the third end surface 68' may extend from the first connecting surface 64' to the second connecting surface 66'. The third end surface 68' may be substantially planar in one or more configurations. The third end surface 68' may be offset from the spindle mounting surface 32. For instance, the third end surface 68' may be spaced apart from the spindle mounting surface 32. In at least one configuration, the third end surface 68' may be disposed substantially parallel to the spindle mounting surface 32. The third end surface 68' may face toward and may engage the brake spider 26 as will be discussed in more detail below.

One or more mounting features 70' may be provided with the third end surface 68'. In the configuration shown, three mounting features 70' are shown; however, it is contemplated that a greater or lesser number of mounting features 70' may be provided. The mounting features 70' may have any suitable configuration, such as a male configuration, a female configuration or combinations thereof. For example, a mounting feature 70' may be configured as a hole that may extend from the third end surface 68' toward the spindle mounting surface 32.

The fourth boss portion 52' may be spaced apart from the third boss portion 50'. In the configuration shown, the fourth boss portion 52' may be disposed closer to the camshaft hole 38 than the third boss portion 50'. Like the third boss portion 50', the fourth boss portion 52' may facilitate mounting of the brake spider 26 and may protrude from the spindle mounting surface 32. In at least one configuration, the fourth boss portion 52' may have an inner surface 80', an outer surface 82', a first connecting surface 84', a second connecting surface 86', a fourth end surface 88', and one or more mounting features 90'.

The inner surface 80' may face toward the axis 40. In addition, the inner surface 80' may extend from the spindle mounting surface 32 to or toward the fourth end surface 88'. The inner surface 80' may be spaced apart from the spindle mounting holes 44. In at least one configuration, the inner surface 80' may extend along an arc or may be disposed at a substantially constant radial distance from the axis 40. In such a configuration, the inner surface 80' may be radially disposed with respect to the axis 40. As is best shown in FIG. 3, the length of the inner surface 80 of the second boss portion 52 from the first connecting surface 84 to the second connecting surface 86 may be greater than a length of the inner surface 80' of the fourth boss portion 52' from the third connecting surface 84' to the fourth connecting surface 86'.

The outer surface 82' may be disposed opposite the inner surface 80'. As such, the outer surface 82' may face away from the axis 40. The outer surface 82' may extend from the spindle mounting surface 32 to or toward the fourth end surface 88'. In at least one configuration, the outer surface 82' may extend along an arc or may be disposed at a substantially constant radial distance from the axis 40. For instance, the outer surface 82' may be arranged substantially parallel to the inner surface 80'.

The first connecting surface 84' may extend from the spindle mounting surface 32 to or toward the fourth end surface 88'. In addition, the first connecting surface 84' may extend between the inner surface 80' and the outer surface 82' or may extend from the inner surface 80' to the outer surface 82'. In at least one configuration, the first connecting surface 84' may face toward the third boss portion 50' and may at least partially define the opening 54'. The first connecting surface 84' or a portion thereof may be substantially planar in one or more configurations.

The second connecting surface 86' may be disposed opposite the first connecting surface 84' and may face toward the first connecting surface 64' of the third boss portion 50'. The second connecting surface 86' may extend from the spindle mounting surface 32 to or toward the fourth end surface 88'. In addition, the second connecting surface 86' may extend between the inner surface 80' and the outer surface 82' or may extend from the inner surface 80' to the outer surface 82'. The second connecting surface 86' may be disposed above the axis 40 in one or more configurations. The second connecting surface 86' may be curved or extend along an arc.

The fourth end surface 88' may face away from the spindle mounting surface 32. The fourth end surface 88' may extend from the inner surface 80' to the outer surface 82'. In addition, the fourth end surface 88' may extend from the first connecting surface 84' to the second connecting surface 86'. The fourth end surface 88' may be substantially planar in one or more configurations. The fourth end surface 88' may be offset from the spindle mounting surface 32. For instance, the fourth end surface 88' may be spaced apart from the spindle mounting surface 32. In at least one configuration, the fourth end surface 88' may be disposed substantially parallel to the spindle mounting surface 32 and/or the third end surface 68'. The fourth end surface 88' may face toward and may engage the brake spider 26 as will be discussed in more detail below.

One or more mounting features 90' may be provided with the fourth end surface 88'. In the configuration shown, one mounting feature 90' is shown; however, it is contemplated that a greater number of mounting features 70' may be provided. The mounting features 70' may have any suitable configuration, such as a male configuration, a female configuration or combinations thereof. For example, a mounting features 90' may have the same configuration as the mounting features 70' of the third boss portion 50'.

The opening 54' may be disposed between the third boss portion 50' and the fourth boss portion 52'. The opening 54' may be at least partially defined by the third boss portion 50' and the fourth boss portion 52'. For example, the opening 54' may be at least partially defined by the first connecting surface 64' of the third boss portion 50' and the second connecting surface 86' of the fourth boss portion 52'. In addition, the opening 54' may be at least partially defined by an opening bottom surface 100'.

The opening bottom surface 100' may extend from the third boss portion 50' to the fourth boss portion 52'. For example, the opening bottom surface 100' may extend from the first connecting surface 64' of the third boss portion 50' to the second connecting surface 86' of the fourth boss portion 52'. In at least one configuration, the opening bottom surface 100' may be offset from the spindle mounting surface 32. For instance, the opening bottom surface 100' may be recessed from the spindle mounting surface 32 such that the opening bottom surface 100' may be axially positioned further from the brake spider 26 than the spindle mounting surface 32.

The camshaft hole 38 may be a through hole that may extend through the knuckle 20. For instance, the camshaft hole 38 may extend from the spindle mounting surface 32 to an opposite side of the knuckle 20 that may face away from the first mounting boss 34 and the second mounting boss 36. The camshaft hole 38 may receive a camshaft that may be configured to actuate a brake pad assembly of the drum brake assembly 28 as will be discussed in more detail below. The camshaft hole 38 may be disposed between the second boss portion 52 and the fourth boss portion 52'. As such, the second boss portion 52 and the fourth boss portion 52' may be disposed on opposite sides of the camshaft hole 38.

Figure 4:
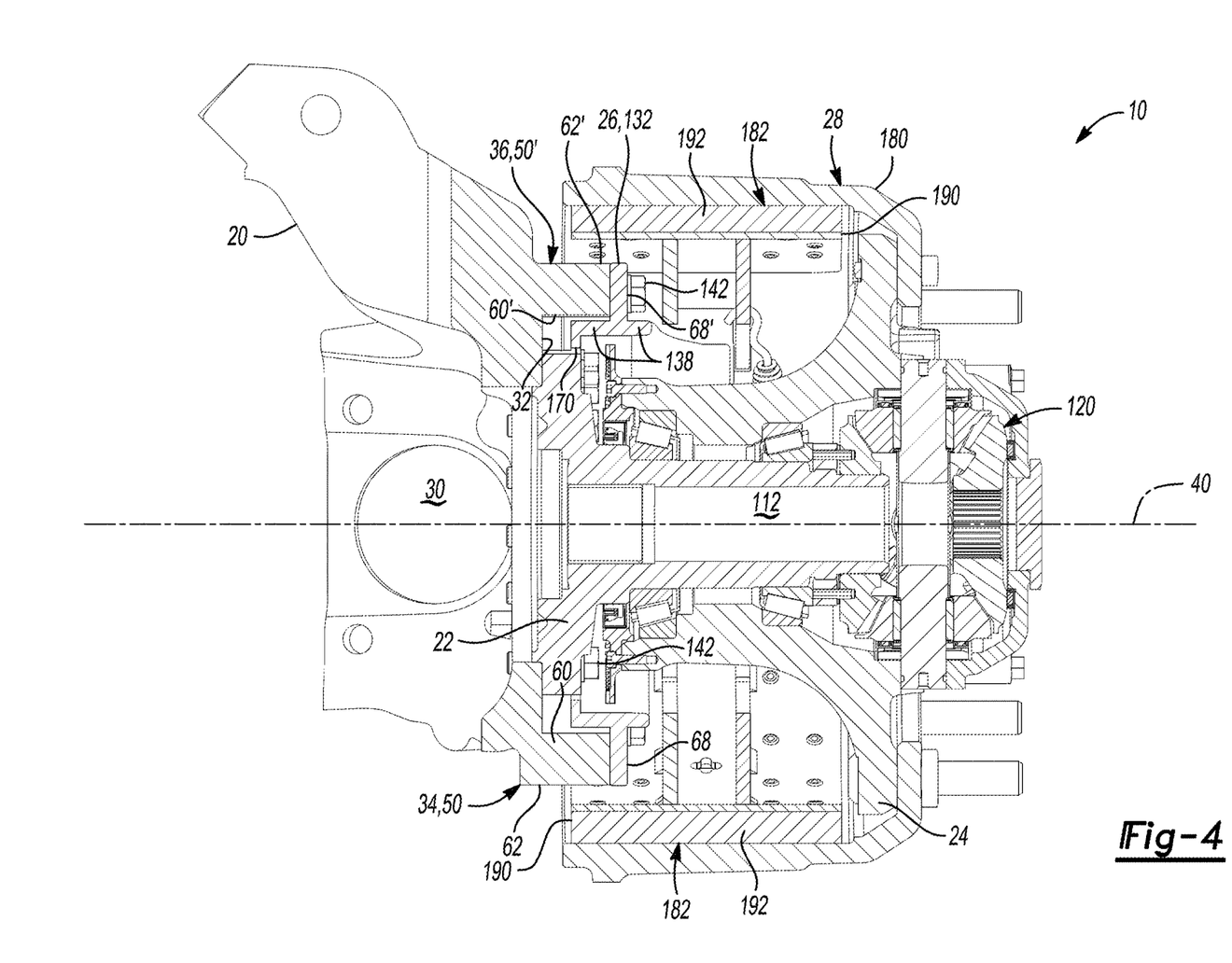
FIG. 4 is a section view of the wheel end assembly along section line 4-4.

Referring to FIGS. 2-4, the spindle 22 may extend along or around the axis 40. The spindle 22 may be configured to support the hub 24. The spindle 22 may be provided as a separate component that may be fastened to the knuckle 20 in one or more embodiments. In such a configuration, the spindle 22 may be mounted to the spindle mounting surface 32. The spindle 22 may be fastened to the knuckle 20 in any suitable manner. For instance, the spindle 22 may include a flange portion that includes a set of fastener holes 110. Each fastener hole 110 may be aligned with a spindle mounting hole 44. A fastener may extend through each fastener hole 110 and into a corresponding spindle mounting hole 44 to couple the spindle 22 to the knuckle 20. Alternatively, the spindle 22 may be press fit inside the opening 42, welded to the knuckle 20, or may be integrally formed with the knuckle 20 as a unitary one-piece component in various embodiments. Optionally, the spindle 22 may define a spindle hole 112. The spindle hole 112 may be configured to receive an axle shaft that may provide torque to the hub 24. An axle shaft may not be provided in configurations in which the spindle 22 does not have a spindle hole 112.

Referring to FIGS. 2 and 4, the hub 24 may facilitate mounting of a wheel upon which a tire may be disposed. For instance, the spindle 22 may be received inside one or more wheel bearings that may rotatably support the hub 24 and may be received inside the hub 24.

As is best shown in FIG. 4, the wheel end assembly 10 may optionally include a gear reduction unit 120. The gear reduction unit 120 may operatively connect the hub 24 to an axle shaft and may provide gear reduction between the axle shaft and the hub 24 or wheel. The gear reduction unit 120 may include a plurality of gears and may be at least partially received inside the hub 24 and one or more embodiments.

Referring to FIGS. 2 and 4, the brake spider 26 may facilitate mounting of the drum brake assembly 28 to the knuckle 20. For instance, the drum brake assembly 28 may be fixedly mounted to the brake spider 26 and the brake spider 26 may be fixedly mounted to the knuckle 20. The brake spider 26 may be mounted to the first mounting boss 34 and the second mounting boss 36. For instance, the brake spider 26 may be mounted to the first boss portion 50, the second boss portion 52, the third boss portion 50', and the fourth boss portion 52'. As is best shown in FIG. 4, the brake spider 26 may be spaced apart from the spindle mounting surface 32. In at least one configuration, the brake spider 26 may include a brake spider hole 130, a mounting flange 132, at least one anchor pin hole 134, a camshaft boss 136, and an inner wall 138.

The brake spider hole 130 may be defined by the brake spider 26. The brake spider hole 130 may be a through hole that may extend continuously around the spindle 22 and may receive the spindle 22.

The mounting flange 132 may extend at least partially around the brake spider hole 130. The mounting flange 132 may extend away from the brake spider hole 130 and may facilitate mounting of the brake spider 26. The mounting flange 132 may engage or contact the first mounting boss 34, the second mounting boss 36, or both. The mounting flange 132 may include a plurality of fastener holes 140 that may each be configured to receive a fastener 142, such as a bolt, that may couple the brake spider 26 to the knuckle 20. In at least one configuration, the fastener 142 may extend through a fastener hole 140 and may be received in a mounting feature 70 of a boss portion, such as the first boss portion 50, second boss portion 52, third boss portion 50', or the fourth boss portion 52'. As such, the mounting flange 132 may be coupled to the first mounting boss 34, the second mounting boss 36, or the first mounting boss 34 and the second mounting boss 36.

Referring to FIG. 2, at least one anchor pin hole 134 may be provided with the brake spider 26. An anchor pin hole 134 may be configured to receive an anchor pin that may support a brake pad assembly of the drum brake assembly 28. In the configuration shown in FIG. 2, two anchor pin holes 134 are depicted. The anchor pin holes 134 may be positioned on the opposite side of the brake spider hole 130 from the camshaft boss 136. In addition, the anchor pin holes 134 may be positioned between the first boss portion 50 and the third boss portion 50'.

The camshaft boss 136 may facilitate mounting of a camshaft of the drum brake assembly 28. The camshaft boss 136 may extend from the mounting flange 132 and may define a camshaft hole 160.

The camshaft hole 160 may receive a camshaft of the drum brake assembly 28. The camshaft hole 160 may be configured as a through hole that may extend through the brake spider 26. In at least one configuration, the camshaft hole 160 may be positioned between the second boss portion 52 and the fourth boss portion 52'.

The inner wall 138 may face toward the axis 40 and may at least partially define the brake spider hole 130. In at least one configuration, the inner wall 138 may extend continuously around the axis 40. The inner wall 138 or portion thereof may extend in an axial direction from the mounting flange 132. For example, a portion of the inner wall 138 may extend axially toward the spindle mounting surface 130 as is best shown in FIG. 4. Optionally, another portion of the inner wall 138 may extend away from the spindle mounting surface 32 and may protrude from the mounting flange 132. In at least one configuration, the inner wall 138 may include or define a rim 170.

Referring to FIG. 4, the rim 170 may extend from an end of the inner wall 138 toward the axis 40. In at least one configuration, the rim 170 may extend continuously around the spindle 22. The rim 170 may be spaced apart from the spindle 22 in one or more embodiments.

Referring to FIGS. 1 and 4, the drum brake assembly 28 may be a friction brake that may be configured to slow or inhibit rotation of at least one associated wheel assembly. The drum brake assembly 28 may be mounted to the brake spider 26. In at least one configuration and as is best shown with reference to FIGS. 1, 2 and 4, the drum brake assembly 28 may include a brake drum 180, at least one brake pad assembly 182, an anchor pin 184, a cam roller 186, and a camshaft 188.

Referring to FIGS. 1 and 4, the brake drum 180 may be disposed on the hub 24 and may be fixedly positioned with respect to the hub 24. The brake drum 180 may extend continuously around brake pad assemblies 182 that may be configured to engage the brake drum 180 to slow rotation of a wheel about the axis 40. The brake drum 180 is shown in FIGS. 1 and 4 but is not shown in FIG. 2 to better show various components of the wheel end assembly 10.

A brake pad assembly 182 may be configured to engage an inner surface of a brake drum 180 to slow the rotation of a vehicle wheel that is coupled to the hub 24. In FIGS. 2 and 4, two brake pad assemblies 182 are shown that are generally disposed opposite each other. As is best shown in FIG. 4, the brake pad assemblies 182 may extend at least partially around the brake spider 26. A brake pad assembly 182 may be disposed further from the axis 40 than the first mounting boss 34 and the second mounting boss 36 and may extend at least partially around the first mounting boss 34, the second mounting boss 36, or both. In addition, a brake pad assembly 182 may be axially positioned closer to the spindle mounting surface 32 than the mounting flange 132 of the brake spider 26. In at least one embodiment, the brake pad assembly 182 may include a brake shoe 190 and a friction material 192.

The brake shoe 190 may be a structural member of a brake pad assembly 182. The brake shoe 190 may be pivotally mounted to the brake spider 26 at a first end via the anchor pin 184. In at least one configuration, the anchor pin 184 may be fixedly positioned with respect to the brake spider 26 and the brake shoe 190 may pivot about an outer surface or circumference of the anchor pin 184 when the brake pad assembly 182 is actuated. It is also contemplated that the anchor pin 184 may be rotatably disposed on the brake spider 26 in other configurations. An opposite end of the brake shoe 190 may engage a cam roller 186 that may be disposed proximate or may engage the camshaft 188. The anchor pin 184 may extend along an anchor pin axis that may be disposed substantially parallel to the axis 40 in one or more embodiments.

The friction material 192, which may also be called a brake lining, may be disposed on an outer surface of the brake shoe 190 and may face toward the brake drum 180. The friction material 192 may engage the brake drum 180 during vehicle braking and may be spaced apart from the brake drum 180 when the friction braking is not being applied.

Referring to FIG. 2, the camshaft 188 may be configured to actuate the brake pad assemblies 182. The camshaft 188 may extend along and may rotate about a camshaft axis. The camshaft axis may be disposed substantially parallel to the axis 40 in one or more embodiments. The camshaft 188 may extend through the camshaft hole 160 in the brake spider 26 and the camshaft hole 38 in the knuckle 20. In addition, the camshaft 188 may be spaced apart from the brake spider 26. The camshaft 188 may have any suitable configuration. For instance, the camshaft 188 may include a cam portion, such as an S-cam that may be configured to engage the cam rollers 186. Rotation of the camshaft 188 in a first direction about a camshaft axis may cause the cam to actuate the cam rollers 186 and the brake pad assemblies 182 such that the friction material 192 moves toward or engages an inner surface of the brake drum 180 to brake or slow or inhibit rotation of an associated wheel. Rotation of the camshaft 188 about the camshaft axis in a second direction may allow the cam rollers 186 and brake pad assemblies 182 to retract or disengage the inner surface of the brake drum 180. The camshaft 188 may be rotated by an actuator as is known by those skilled in the art.

A wheel end assembly as described above may allow wider brake pad assemblies to be provided. For instance, a brake pad assembly having a width in an axial direction of approximately 7.0 inches (approximately 18 cm) may be employed rather than a brake pad assembly having a width of approximately 6.0 inches (approximately 15 cm10. A wider brake pad may allow more friction material to be provided and may provide greater surface area for contacting the brake drum, which may help improve braking performance. A wider 7.0 inch brake pad assembly may not be mountable on previous knuckle designs as other components, such as a brake drum and the knuckle, may contact a wider brake pad assembly and prevent mounting of a wider brake pad assembly. A wheel end assembly as described above may allow wider brake pads to be mounted without exceeding a maximum width limit, such as the 102 inch (259.1 cm) maximum width limit for commercial motor vehicles by the U.S. Department of Transportation. A wheel end assembly as described above may allow the brake spider to be mounted to the knuckle independently of a spindle, which in turn may allow larger diameter wheel bearings to be utilized without creating interference with the hub, fasteners for mounting the spindle, fasteners for mounting the brake spider, or combinations thereof. Independent mounting of the brake spider and spindle may allow the fasteners for the spindle to be tailored to accommodate load forces incurred by the spindle rather than also accommodating brake reaction forces. Likewise, the brake spider and its associated mounting components may be designed to accommodate braking forces independent of spindle load forces and may allow associated fasteners to be positioned further from the axis than the spindle fasteners, which may improve force distribution.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wheel end assembly comprising:
    a knuckle that includes:
        a spindle mounting surface; and
        a first mounting boss that extends from the spindle mounting surface, wherein the first mounting boss includes a first boss portion and a second boss portion that is spaced apart from the first boss portion;
    a brake spider having a mounting flange that is directly mounted to the first boss portion and the second boss portion; and
    a drum brake assembly mounted to the brake spider, wherein the drum brake assembly includes a brake pad assembly that extends partially around the first mounting boss;
    wherein the first boss portion has an inner surface that faces toward an axis and is radially disposed with respect to the axis, an outer surface that is disposed opposite the inner surface and that faces away from the axis, a first end surface that engages the brake spider, and a first connecting surface that extends from the inner surface to the outer surface, the second boss portion has an inner surface that faces toward the axis and is radially disposed with respect to the axis, an outer surface that is disposed opposite the inner surface and that faces away from the axis, a second end surface that engages the brake spider, and a second connecting surface that extends from the inner surface to the outer surface, wherein an opening extends between the first boss portion and the second boss portion from the first connecting surface to the second connecting surface and separates the first boss portion from the second boss portion, wherein the opening is at least partially defined by the first boss portion, the second boss portion, and an opening bottom surface that extends from the first boss portion to the second boss portion, wherein the opening bottom surface is offset from the spindle mounting surface.

2. The wheel end assembly of claim 1 wherein the brake spider is spaced apart from the spindle mounting surface.

3. The wheel end assembly of claim 1 wherein the brake pad assembly is axially positioned closer to the spindle mounting surface than the mounting flange is positioned to the spindle mounting surface.

4. The wheel end assembly of claim 1 wherein the opening bottom surface is axially positioned closer to the brake spider than the spindle mounting surface is positioned to the brake spider.

5. The wheel end assembly of claim 1 further comprising a second mounting boss that extends from the spindle mounting surface and is spaced apart from the first mounting boss, wherein the second mounting boss includes a third boss portion and a fourth boss portion that is spaced apart from the third boss portion, wherein the brake spider is directly mounted to the third boss portion and the fourth boss portion.

6. The wheel end assembly of claim 5 wherein the brake spider has a camshaft hole that receives a camshaft and is positioned between the second boss portion and the fourth boss portion.

7. The wheel end assembly of claim 6 wherein the brake spider has a first anchor pin hole that receives an anchor pin that rotatably supports the brake pad assembly, wherein the first anchor pin hole is positioned between the first boss portion and the third boss portion.

8. The wheel end assembly of claim 1 further comprising a spindle that is mounted to the spindle mounting surface, wherein the brake spider defines a brake spider hole that extends continuously around and receives the spindle.

9. The wheel end assembly of claim 1 wherein the brake pad assembly extends partially around the brake spider.

10. The wheel end assembly of claim 1 wherein the brake spider has an inner wall that faces toward the axis and that extends in an axial direction from the mounting flange toward the spindle mounting surface.

11. The wheel end assembly of claim 10 wherein the inner wall extends in the axial direction from the mounting flange away from the spindle mounting surface.

12. The wheel end assembly of claim 11 wherein a rim extends from an end of the inner wall toward the axis.

13. The wheel end assembly of claim 1 wherein a spindle is fastened to the spindle mounting surface and does not contact the first mounting boss.

14. The wheel end assembly of claim 1 wherein a spindle is fastened to the spindle mounting surface and does not contact the first boss portion and the second boss portion.

15. A wheel end assembly comprising:
    a knuckle that includes:
        a spindle mounting surface;
        a first mounting boss that extends from the spindle mounting surface, wherein the first mounting boss includes a first boss portion and a second boss portion that is spaced apart from the first boss portion, wherein the first boss portion has an inner surface that faces toward an axis and is radially disposed with respect to the axis, an outer surface that is disposed opposite the inner surface and that faces away from the axis, and a first connecting surface that extends from the inner surface to the outer surface, the second boss portion has an inner surface that faces toward the axis and is radially disposed with respect to the axis, an outer surface that is disposed opposite the inner surface and that faces away from the axis, and a second connecting surface that extends from the inner surface to the outer surface, wherein an opening extends between the first boss portion and the second boss portion from the first connecting surface to the second connecting surface and separates the first boss portion from the second boss portion;

a second mounting boss that extends from the spindle mounting surface and is spaced apart from the first mounting boss, wherein the second mounting boss includes a third boss portion and a fourth boss portion that is spaced apart from the third boss portion, and a camshaft hole that extends along a camshaft axis and receives a camshaft that is configured to actuate a brake pad assembly, wherein the camshaft axis is disposed closer to the axis than the outer surface of the second boss portion is disposed to the axis, the second boss portion and the fourth boss portion are disposed on opposite sides of the camshaft hole, and the camshaft hole is disposed between the second boss portion and the fourth boss portion;

a brake spider having a mounting flange that is directly mounted to the first boss portion, the second boss portion, the third boss portion, and the fourth boss portion; and a drum brake assembly mounted to the brake spider, wherein the drum brake assembly includes the brake pad assembly and the brake pad assembly extends partially around the first mounting boss.

16. The wheel end assembly of claim 15 wherein the first boss portion has a first end surface that engages the brake spider and the second boss portion has a second end surface that engages the brake spider.

17. The wheel end assembly of claim 15 wherein the opening is at least partially defined by the first boss portion, the second boss portion, and an opening bottom surface that extends from the first boss portion to the second boss portion, wherein the opening bottom surface is offset from the spindle mounting surface.

18. The wheel end assembly of claim 15 wherein the fourth boss portion has an inner surface that faces toward the axis and wherein a length of the inner surface of the second boss portion is greater than a length of the inner surface of the fourth boss portion.

19. A wheel end assembly comprising:
a knuckle that includes:
a spindle mounting surface that extends around an axis; and
a first mounting boss that extends from the spindle mounting surface;

a brake spider that has a mounting flange that engages and is coupled to the first mounting boss and a camshaft boss that extends from the mounting flange and defines a camshaft hole that receives a camshaft, wherein the brake spider has an inner wall that faces toward the axis and that extends in an axial direction from the mounting flange toward the spindle mounting surface and extends in the axial direction from the mounting flange away from the spindle mounting surface, and a rim extends from an end of the inner wall toward the axis and extends continuously around a spindle that is fastened to the spindle mounting surface; and a drum brake assembly that is mounted to the brake spider, wherein the drum brake assembly includes a brake pad assembly that extends partially around the first mounting boss, wherein the brake pad assembly is axially positioned closer to the spindle mounting surface than the mounting flange is positioned to the spindle mounting surface.

20. The wheel end assembly of claim 19 wherein the first mounting boss further comprises a first boss portion and a second boss portion, the first boss portion further comprises an inner surface that faces toward the axis, an outer surface that is disposed opposite the inner surface and that faces away from the axis, and a first connecting surface that extends from the inner surface to the outer surface, the second boss portion further comprises an inner surface that faces toward the axis, an outer surface that is disposed opposite the inner surface and that faces away from the axis, and a second connecting surface that extends from the inner surface to the outer surface and faces toward the first connecting surface, wherein an opening extends between the first boss portion and the second boss portion from the first connecting surface to the second connecting surface and separates the first boss portion from the second boss portion.

21. The wheel end assembly of claim 19 wherein the first mounting boss includes a first boss portion and a second boss portion that is spaced apart from the first boss portion, wherein the second boss portion is disposed closer to the camshaft hole than the first boss portion.

22. The wheel end assembly of claim 19 further comprising a second mounting boss that extends from the spindle mounting surface and is spaced apart from the first mounting boss, wherein the brake spider is coupled to the second mounting boss.

23. The wheel end assembly of claim 22 wherein the second mounting boss further comprises a third boss portion and a fourth boss portion, wherein an opening extends from a third connecting surface of the third boss portion to a fourth connecting surface of the fourth boss portion and separates the third boss portion from the fourth boss portion, wherein the third connecting surface extends from an inner surface of the third boss portion that faces toward the axis to an outer surface of the third boss portion that faces away from the axis.

24. The wheel end assembly of claim 19 wherein the rim does not contact the first mounting boss.

* * * * *